(12) United States Patent
Mossman

(10) Patent No.: US 7,784,770 B2
(45) Date of Patent: Aug. 31, 2010

(54) METHOD FOR HUMIDIFYING A REACTANT STREAM FOR A FUEL CELL

(75) Inventor: Alexander D Mossman, Vancouver (CA)

(73) Assignee: BDF IP Holdings Ltd., Vancouver, BC (CA)

( * ) Notice: Subject to any disclaimer, the term of this patent is extended or adjusted under 35 U.S.C. 154(b) by 1119 days.

(21) Appl. No.: 11/450,804

(22) Filed: Jun. 8, 2006

(65) Prior Publication Data

US 2006/0228597 A1 Oct. 12, 2006

Related U.S. Application Data

(60) Division of application No. 11/050,409, filed on Feb. 2, 2005, now Pat. No. 7,078,117, which is a division of application No. 09/800,751, filed on Mar. 7, 2001, now Pat. No. 6,864,005, which is a continuation-in-part of application No. 09/521,228, filed on Mar. 8, 2000, now abandoned.

(51) Int. Cl.
*B01F 3/04* (2006.01)
(52) U.S. Cl. ..................................... 261/104
(58) Field of Classification Search ................ 261/102, 261/104, 105, 107
See application file for complete search history.

(56) References Cited

U.S. PATENT DOCUMENTS

| | | | |
|---|---|---|---|
| 4,613,436 A | | 9/1986 | Wight et al. ............... 210/232 |
| 5,348,691 A | * | 9/1994 | McElroy et al. ............ 261/36.1 |
| 5,523,181 A | | 6/1996 | Stonehart et al. ........... 429/192 |
| 5,910,378 A | | 6/1999 | Debe et al. .................. 429/42 |
| 5,942,347 A | * | 8/1999 | Koncar et al. ............... 429/30 |

(Continued)

FOREIGN PATENT DOCUMENTS

CA 2242176 12/1998

(Continued)

OTHER PUBLICATIONS

Salto, K. et al., Development of Anti-freeze PEFC Stack for Automobile Application, in *Proceedings of the 6th FCDIC Fuel Cell Symposium*, Tokyo, Japan, May 17-18, 1999, pp. 60-64.

*Primary Examiner*—Scott Bushey
(74) *Attorney, Agent, or Firm*—Seed IP Law Group PLLC

(57) ABSTRACT

A membrane exchange humidifier employs a water permeable membrane comprising a microporous polymer and a hydrophilic additive. In operation, the membrane preferably has favorable water transmission properties and resists transmission of reactant gas or other components. The membrane is suitable for use even when permeable in its dry condition to the wet or dry gases in the humidifier, and/or when the wet and dry gases are of different composition. By wetting the membrane, the presence of an amount of liquid water in the wet gas can reduce gas transmission through the membrane to an acceptable level. The humidifier is useful in fuel cell systems in which a reactant gas supply stream, such as the oxidant supply stream, is humidified primarily using water vapor from a fuel cell reactant exhaust stream. The humidifier is particularly suitable for use in conjunction with solid polymer fuel cell systems. The improved mechanical and welding properties of the membrane allow for a simpler humidifier configuration.

14 Claims, 2 Drawing Sheets

U.S. PATENT DOCUMENTS

| | | | |
|---|---|---|---|
| 5,996,976 A | 12/1999 | Murphy et al. | 261/104 |
| 6,106,964 A | 8/2000 | Voss et al. | 429/20 |
| 6,511,052 B1 * | 1/2003 | Tonkin et al. | 261/101 |
| 2002/0160240 A1 * | 10/2002 | Matsui et al. | 429/19 |
| 2003/0025219 A1 * | 2/2003 | Tonkin et al. | 261/104 |

FOREIGN PATENT DOCUMENTS

| | | |
|---|---|---|
| DE | 42 01 632 A1 | 7/1993 |
| JP | 60/183008 | 9/1985 |
| JP | 08-128682 | 5/1996 |
| JP | 9-141655 | 6/1997 |
| JP | 10-16104 | 1/1998 |
| JP | 10-128079 | 5/1998 |
| JP | 2000-15066 | 1/2000 |
| WO | WO 99/65090 | 12/1999 |
| WO | WO 99/67829 | 12/1999 |
| WO | WO 00/63982 | 10/2000 |

* cited by examiner

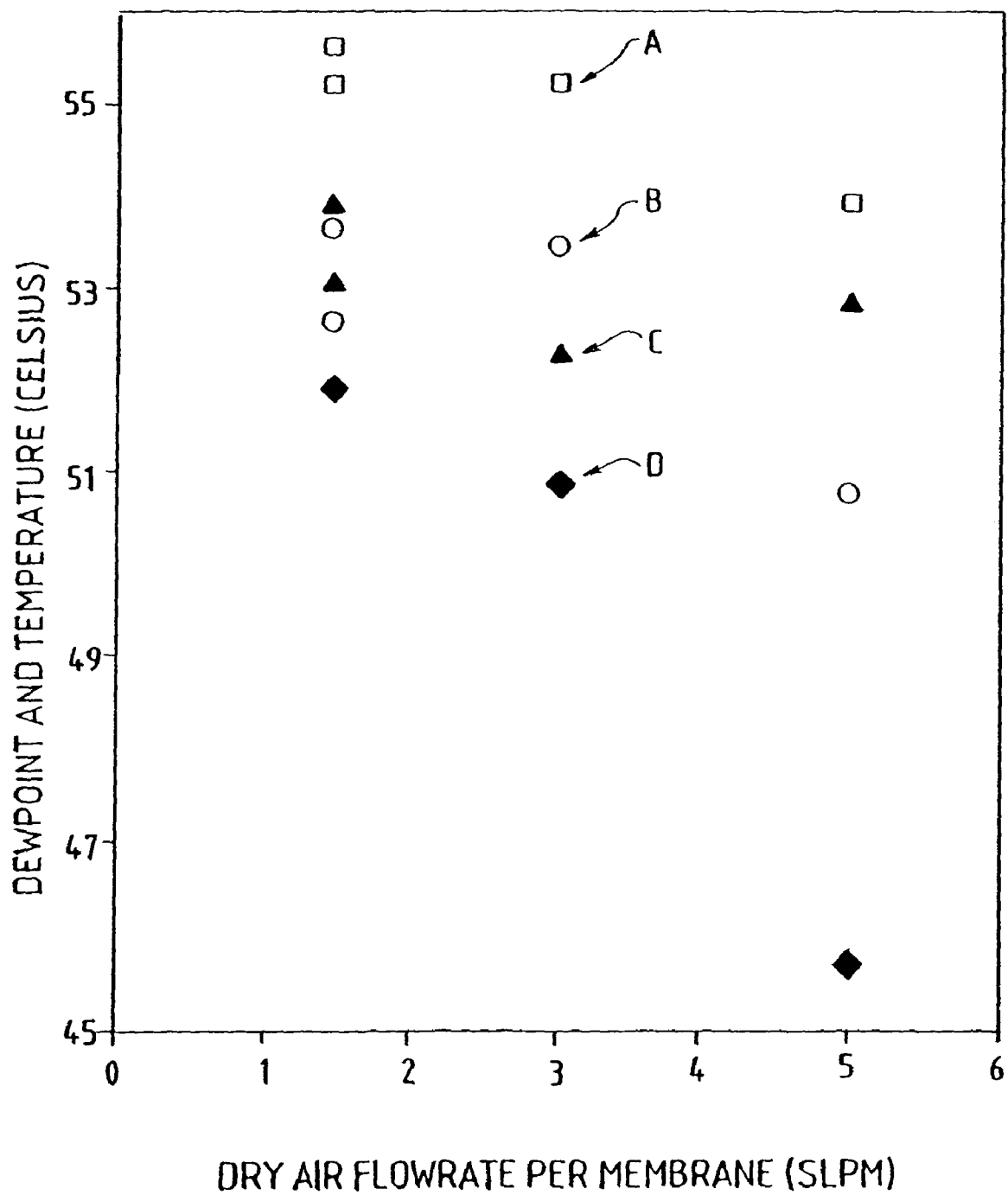

METHOD FOR HUMIDIFYING A REACTANT STREAM FOR A FUEL CELL

CROSS-REFERENCE TO RELATED APPLICATIONS

This application is a divisional of U.S. application Ser. No. 11/050,409 filed Feb. 2, 2005 now U.S. Pat. No. 7,078,117; which is a divisional of U.S. application Ser. No. 09/800,751 filed Mar. 7, 2001 (U.S. Pat. No. 6,864,005); which is a continuation-in-part of U.S. application Ser. No. 09/521,228 filed Mar. 8, 2000, now abandoned; all of these applications are incorporated by reference in their entireties.

FIELD OF THE INVENTION

The present invention relates to membrane exchange humidifiers particularly for use in humidifying reactant streams for solid polymer electrolyte fuel cell systems.

BACKGROUND OF THE INVENTION

Membrane exchange humidifiers comprise a membrane that is permeable to water and/or water vapor. The fluid stream to be humidified (the dry stream) is directed over one side of the membrane while the fluid stream supplying the water (the wet stream) is directed over the opposing side of the membrane. (The terms "dry" and "wet" in this instance are relative terms; "dry" does not necessarily mean the complete absence of water, and "wet" does not necessarily mean saturation with water.) Water from the wet stream passes through the membrane, thereby humidifying the dry stream. These humidifiers have been used for many purposes (e.g., medical equipment, air conditioners).

Certain humidifier applications involve gaseous wet and dry streams whose compositions, except for the concentration of water, are similar. In such cases, membrane materials may be used that are significantly permeable not only to water but also to other components in the gaseous wet or dry streams. Additionally, certain humidifier applications involve wet streams that are simply liquid aqueous solutions or liquid water alone. In such cases, membrane materials may be used that are quite permeable to gases generally but not to liquid. Thus, in certain humidifier applications employing a liquid wet stream, microporous polymer membranes such as GORE-TEX® (polytetrafluoroethylene) may be employed.

However, if the humidifier application involves the use of wet and dry fluid streams of differing composition, then the membrane may preferably be selectively permeable to water. Otherwise, other components of the wet and dry fluid streams may mix undesirably via transport through the membrane. An example of a humidifier application in which the wet and dry fluid streams may be of differing composition is disclosed in U.S. patent application Ser. No. 09/108,156, filed Jun. 30, 1998, also owned by the assignee of the present application. In the '156 application, which is incorporated herein by reference in its entirety, a solid polymer fuel cell system is disclosed in which a reactant gas supply stream to the fuel cell may be adequately humidified using a reactant gas exhaust stream from the fuel cell via a membrane exchange humidifier apparatus. In particular embodiments, an air supply stream to the fuel cell may be adequately humidified using the wet oxygen-depleted air exhaust stream from the fuel cell. Typically, while the wet oxygen-depleted depleted exhaust stream is predominantly gaseous, a portion consists of water in the liquid phase. In the Examples of the '156 application, NAFION® perfluorosulfonic acid membranes were used in the humidifiers. These membranes essentially prevent significant transmission of air or oxygen-depleted air therethrough.

In a solid polymer fuel cell, the ionic conductivity of the solid polymer electrolyte and the performance of the fuel cell are affected by the hydration level (both generally increasing with water content). As a result, fuel and/or oxidant reactant gas streams supplied to the fuel cell are typically humidified in order to maintain a sufficiently high level of hydration in the solid polymer electrolyte during operation.

The capacity of the reactant gases to absorb water vapor varies significantly with changes in temperature and pressure. If the reactant gas stream is humidified at a temperature higher than the fuel cell operating temperature, this can result in condensation of liquid water when the humidified reactant gas stream enters the fuel cell. Condensation may cause flooding in the electrodes, which may detrimentally affect fuel cell performance. Conversely, if the reactant gas stream is humidified at a temperature lower than the fuel cell operating temperature, the reduced water vapor content in the reactant gas stream could result in dehydration and damage to the solid polymer electrolyte. It is therefore preferred to humidify a reactant gas stream, typically at least the oxidant gas supply stream, at or close to the operating temperature and pressure within the fuel cell.

The solid polymer fuel cell system of the '156 application employs an effective arrangement for adequately humidifying and heating a reactant gas supply stream using a membrane exchange apparatus and a reactant gas exhaust stream from the fuel cell (typically at a slightly lower pressure than the supply stream). The reactant streams exiting the fuel cell (particularly the oxidant stream) typically contain sufficient water near the operating temperature of the fuel cell for purposes of humidification. This water in the reactant exhaust stream comes from water produced by the electrochemical reaction at the fuel cell cathode and from water vapor already present in the humidified stream delivered to the fuel cell. Use of an appropriate humidifier design and appropriate system operating parameters provides for adequate humidification of a reactant supply stream. For instance, certain values for the ratio (denoted by the dimensionless parameter R) of residence time divided by diffusion time for a hypothetical water molecule in a given chamber in the membrane exchange humidifier were found to be preferred. (By "hypothetical water molecule", it is acknowledged that this ratio R is determined by a calculation based on apparatus characteristics and fluid flow rates and not by actual measurement of one or more water molecules.) To obtain the greatest flux of water through the membrane, the ratio R for the flows in the chambers may preferably be between about 0.75 and 3. This kind of humidifier is suitable for use with solid polymer fuel cell systems generally, including portable air-cooled systems that have no supply of liquid water coolant that can be used for humidification, as well as larger water-cooled systems.

A preferred configuration for a humidifier in one of the fuel cell systems described in the '156 application is a multiple plate-and-frame construction comprising a stack of plate-and-frame membrane exchange assemblies wherein each plate-and-frame membrane exchange assembly comprises a water permeable membrane sandwiched between two plates.

Although NAFION® and other similar materials are suitable as membrane materials, they also have certain disadvantages. For instance, NAFION® is not dimensionally stable under the varying humidity and temperature conditions of a fuel cell system (in which a humidifier may be exposed to humidity and temperature cycles ranging from ambient conditions during storage to conditions of full humidification at temperatures of about 100° C. or more). As a consequence, a NAFION® membrane may sag during operation and thus supporting ribs and/or bridges near the reactant stream inlet and outlet ports may be needed in a humidifier, thereby complicating design and construction. A requirement for bridges in particular can complicate construction. Further, if dimension changes from the dry state cannot readily be accommodated, it may be necessary to assemble such humidifiers with the membrane material in a wet state, a significant complication during assembly. Additionally, such materials are often not amenable to attaching via gluing or melt-bonding and thus compression type seals may need to be employed, again complicating design and assembly. Finally, such materials tend to be expensive. Thus, with regard to these disadvantages, other choices of membrane materials might be preferred.

Microporous polymer sheets comprising hydrophilic additives (for example, silica filled polyethylene sheets from companies such as PPG, Duramic, Entek, or Jungfer, silica filled latex sheet from Amerace, silica filled PVDF sheet from Elf Atochem, silica filled PVC sheet from Amersil) have been available commercially for some time and have found application as printing sheets and as battery separators. Such sheets may have good mechanical and water transmission properties but also may be significantly permeable to other fluids as well. Unlike many hydrophobic microporous sheet materials (for example, GORETEX®), these hydrophilic sheets may also be significantly permeable to liquid water and thus be considered unsuitable in certain applications (for example, wettable hydrophilic sheets that can transmit liquid water from the "wet" side to the "dry" side when the "dry" side is touched would be unsuitable as water proof breathable clothing).

SUMMARY OF THE INVENTION

A microporous polymer membrane comprising a hydrophilic additive or filler is employed in an improved membrane exchange humidifier. Such membranes may be competitive with regard to water transmission rate (hence humidification rate) and be inexpensive, tough, dimensionally stable, and bondable using adhesives or via melt bonding. Further, it may be possible to form additional structural features (for example, supporting ribs) into such membranes themselves. The use of membranes with such properties allows for a simpler configuration and simplified assembly of a membrane exchange humidifier.

In one aspect, improved humidification and methods thereof are provided using a membrane exchange apparatus in situations involving gaseous wet and dry streams which have differing compositions, one or more components of which, along with water, may permeate the membrane. Thus, the dry or first fluid stream comprises a first gas composition, and the wet or second fluid stream comprises water vapor and a second gas composition that is different from the first gas composition. For instance, the first gas composition may be air and the second gas composition may be oxygen-depleted air.

In the membrane exchange apparatus, a suitable water permeable membrane is employed, and the first fluid stream is directed across one major surface of the water permeable membrane and the second fluid stream is directed across the opposing major surface. The water permeable membrane for the membrane exchange apparatus is selected from membranes that, when dry or substantially dry, are permeable to at least one component of the first and second gas compositions, but when used in operation, the membranes do not transfer said at least one component to an extent that interferes with the desired results. In some embodiments, the membranes, when wet or substantially wet, may be substantially impermeable to such component(s). The water permeable membrane comprises a microporous polymer and a hydrophilic additive. However, the microporous polymer in the membrane may itself be hydrophobic, for example, high density polyethylene.

The water permeable membrane preferably comprises sufficient hydrophilic additive to render it wettable to water. Thus, when the second fluid stream comprises liquid water, the membrane may become wetted and saturated with liquid water. This may effectively "seal" the membrane sufficiently so as to hinder the unwanted transfer of other gases across it. The second fluid stream comprises liquid water when the dewpoint temperature of the second fluid stream is greater than its actual temperature. Suitable hydrophilic additives include silica or alumina and may be, for example, in fiber or powder form. Preferable amounts of hydrophilic additive in the water permeable membrane are typically amounts greater than about 25% by weight.

Such water permeable membranes are preferably characterized by pore structures in which the total porosity is greater than about 50%. Further, the average pore size may be from about 0.025 to about 0.1 micrometers. The Gurley air flow in preferred membranes is between about 500 and about 4000 seconds per 100 $cm^3$ air.

The improved humidifier is particularly suitable for use in humidifying a reactant gas supply stream for a solid polymer fuel cell. Thus, an embodiment of the invention is a solid polymer fuel cell system including a solid polymer fuel cell and an apparatus for humidifying a reactant gas supply stream. The fuel cell has a reactant gas inlet port and a reactant gas exhaust port. The apparatus for humidifying the reactant gas supply stream is an improved membrane exchange humidifier comprising, or in some embodiments consisting essentially of: a supply stream chamber having an inlet and outlet wherein a reactant gas supply is fluidly connected to the supply stream chamber inlet, and the supply stream chamber outlet is fluidly connected to the reactant gas inlet port of the fuel cell; an exhaust stream chamber having an inlet and outlet wherein the reactant gas exhaust port of the fuel cell is fluidly connected to the exhaust stream chamber inlet; and a water permeable membrane separating the supply stream chamber and the exhaust stream chamber whereby water can be transferred from a reactant gas exhaust stream to the reactant gas supply stream across the water permeable membrane. In some embodiments, the reaction gas exhaust port of the fuel cell is directly connected to the exhaust stream chamber inlet without a cooler or condenser interposed between them. Further, the water permeable membrane, when dry or substantially dry, may be permeable to at least one component of one of the reactant gas supply and/or exhaust streams; however, when used in operation, the membrane does not transfer said at least one component to an extent that significantly interferes with fuel cell operation. In some embodiments, the water permeable membrane, when wet or substantially wet, may be substantially impermeable to said at least one component. The membrane comprises a microporous polymer and a hydrophilic additive.

In a solid polymer fuel cell system equipped with a membrane exchange humidifier, preferably the reactant gas supply stream is an oxidant supply stream and the reactant gas exhaust stream is an oxidant exhaust stream. Adequate humidification can be achieved when the flow rate of a reactant gas stream through the appropriate humidifier chamber is selected such that the residence to diffusion time ratio, R, for a hypothetical water molecule therein is in the range from about 0.75 to 3. (By "hypothetical water molecule", it is acknowledged that this ratio R is determined by a calculation described below and not by actual measurement of one or more water molecules.) R is preferably in this range for hypothetical water molecules in both the supply and exhaust stream chambers. For a chamber comprising n channels with dimensions of l, w, and d for channel length, width, and depth respectively, the diffusion time in that chamber is given by $d^2/D$ where D is the diffusivity of water in air (0.22 cm$^2$/second). The flow in the chamber (volume per unit time) is generally laminar in the range of interest and is denoted by V. The residence time in that chamber is then given by $(n*l*w*d)/V$ and thus R is given by $(D*n*l*w)/(V*d)$.

Another aspect relates to an improved humidifier configuration for a solid polymer fuel cell system that may be employed when membranes with improved mechanical characteristics are employed. The membrane exchange humidifier configuration may be selected from a plate-and-frame, spiral wound, and tube bundle configuration. A preferred membrane exchange humidifier has a plate-and-frame stack configuration comprising a stack of at least one membrane and frame unit. In the unit, a water permeable membrane is sandwiched by an upper frame and a lower frame. The upper and lower frames define upper and lower chambers respectively. The upper frame comprises two upper ports, preferably at opposite ends of the upper frame periphery. In a like manner, the lower frame comprises two lower ports, preferably at opposite ends of the lower frame periphery. The water permeable membrane comprises four openings in which two of the openings are aligned with the upper frame ports and the other two openings are aligned with the lower frame ports. As a result, fluid communication is provided between the lower frame ports and the interior of the upper frame. Also, fluid communication is provided between the upper frame ports and the interior of the lower frame. The unit also comprises seals between the water permeable membrane and the frame portions surrounding each of the upper and lower ports. At least one of these seals consists essentially of a bond between the water permeable membrane and at least one of the upper and lower frames. These seals preferably consist essentially of bonds between the water permeable membrane and the upper and lower frames.

Although the two lower frame ports are generally out of alignment with the two upper frame ports, it can be advantageous to have portions of the port-surrounds of each of the two lower frame ports align with portions of the port-surrounds of the two upper frame ports. In a multiple plate-and-frame stack, this partial alignment of the port-surrounds serves to support the plates and frames in the vicinity of the aligned portions.

A simple construction for the membrane exchange humidifier employs rectangular membrane-and-frame units. For further simplicity in construction, the frame pieces can be made identically, but during assembly of the unit, the upper frame is rotated with respect to the lower frame to obtain the desired configuration.

Using certain of these membrane materials, it may be possible to form structurally suitable features in the membrane itself thereby simplifying construction further and offering other advantages. For instance, ribs may be formed in the membrane material for purposes of mechanical support or for directing fluid flow in the humidifier. Continuous ribs formed around the periphery of the membrane may serve as the frames in a membrane-and-frame unit. Such ribs may desirably have tongue-in-groove geometry such that a unit may mate readily with an adjacent unit. Further, ribs (or other textured features) formed in the membrane material can effectively increase the surface area available for the exchange of heat and humidity in a membrane exchange humidifier.

The construction of a membrane exchange humidifier with a spiral wound configuration may also be simplified by using suitably formed ribs in the membrane material itself. For instance, ribs may be configured in a sheet of membrane material such that, when the sheet is spirally wound, the ribs serve to separate adjacent wraps of membrane, to form features for directing fluid flow, and to form the walls of supply and exhaust chambers in the humidifier.

Certain of these membrane materials may also be extruded thereby providing for simpler humidifier construction. For instance, a hollow extrusion die with a grid shaped orifice may be used to extrude such materials into a tubular bundle humidifier embodiment that consists of a bundle of adjacent rectangular tubes.

BRIEF DESCRIPTION OF THE DRAWINGS

FIG. 3 plots the dewpoint and temperature of air streams humidified and heated by the membrane exchange apparatus of the Examples in which either a microporous high density polyethylene and silica additive membrane or a perfluorosulfonic acid membrane was used.

DETAIL DESCRIPTION OF PREFERRED EMBODIMENT(S)

Figure 1:
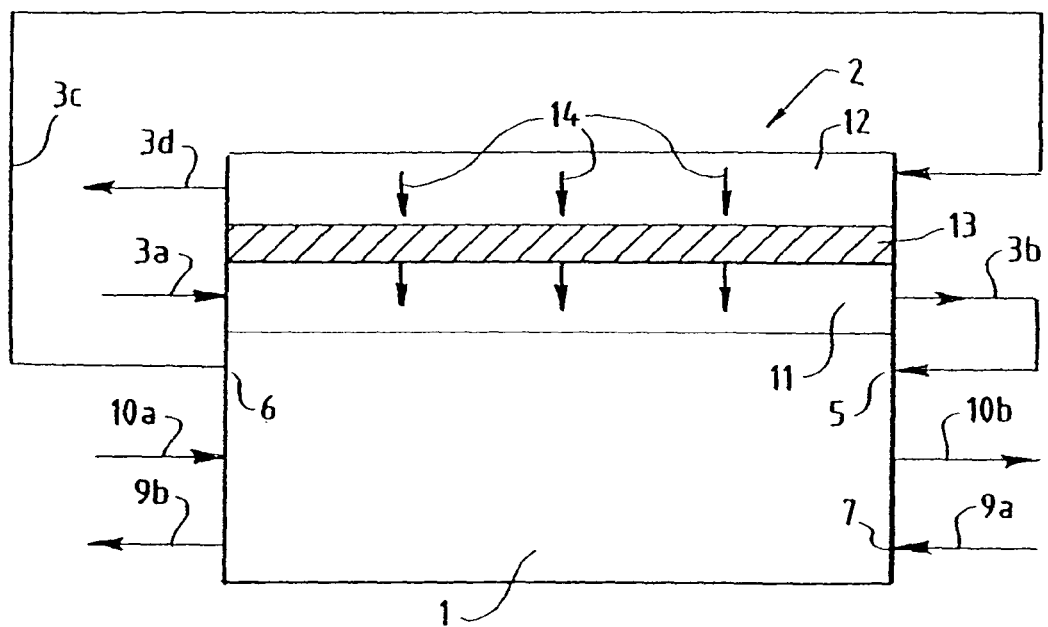
FIG. 1 is a schematic diagram illustrating an embodiment of a solid polymer fuel cell system including a solid polymer fuel cell stack in contact with a membrane exchange humidifier in which an exhaust reactant stream from the stack is used to humidify and heat a reactant stream supplied to the stack.

A solid polymer fuel cell system is shown schematically in FIG. 1, and includes a solid polymer fuel cell stack 1 in contact with an improved membrane exchange humidifier 2. Air is employed as the oxidant supply for stack 1. While either the fuel or oxidant exhaust stream can be used for humidification, the latter typically contains more water and is preferably selected. Further, although either or both of the fuel or oxidant supply stream can be heated and humidified, the oxidant supply stream is generally the selected stream. The fuel supply stream may also be humidified by other means. In addition, if using the oxidant exhaust stream for humidification and if non-water components of the reactant streams are capable of permeating the membrane in the humidifier to a significant extent, only the oxidant supply stream would be heated and humidified in this way, to avoid undesirable, and potentially unsafe, mixing of the fuel and oxidant in the humidifier. FIG. 1 thus shows air supply stream 3a being heated and humidified by air exhaust stream 3c.

In FIG. 1, humidifier 2 comprises a supply stream chamber 11, an exhaust stream chamber 12 and an improved water permeable membrane 13 separating chambers 11 and 12. Solid polymer fuel cell stack 1 is supplied with fuel supply stream 9a at fuel stream inlet port 7. Fuel exhaust stream 9b exits stack 1 at fuel stream outlet port 8. Stack 1 is cooled during operation by coolant supply stream 10a, which is directed through stack 1 and then exits as coolant exhaust stream 10b. The coolant may be air, water, or some other fluid. Although FIG. 1 schematically shows the coolant ports between the fuel and oxidant ports, it is to be understood that fuel and oxidant flow paths in the fuel cell stack are operatively positioned across from one another and separated by solid polymer membrane(s). Air supply stream 3a is initially directed through supply stream chamber 11 and is heated and humidified therein. The heated and humidified air supply stream 3b is then supplied to stack 1 at air stream inlet port 5. The air exhaust stream 3c exits stack 1 at air stream outlet port 6 and is then directed to exhaust stream chamber 12. In this embodiment, since the fuel cell electrochemical reaction is exothermic and produces water, air exhaust stream 3c will be warmer and have a partial pressure of water vapor higher than air supply stream 3a. Heat and water from air exhaust stream 3c are thus transferred through membrane 13 to air supply stream 3a as indicated by the arrows numbered 14. After the transfer of heat and water, air exhaust stream 3d exits exhaust stream chamber 12.

Air supply stream 3a becomes progressively warmer and wetter as it traverses supply stream chamber 11 while air exhaust stream 3c becomes progressively cooler and drier as it traverses exhaust stream chamber 12. Preferably, the hottest and wettest portion of air exhaust stream 3c is employed to further heat and humidify the hottest and wettest portion of air supply stream 3a. The two streams 3a and 3b are thus preferably directed through humidifier 2 in a counterflow configuration as shown in FIG. 1. Further, humidifier 2 is preferably placed in direct thermal contact with fuel cell stack 1 so that, in operation, heat emanating from fuel cell stack 1 contributes to heating air supply stream 3a in supply stream chamber 11. In this regard, supply stream chamber 11 is preferably closer than chamber 12 to stack 1 as shown in FIG. 1. In addition, it is preferable that humidifier 2 is oriented to take advantage of a temperature gradient in stack 1 (the temperature generally increasing in the coolant flow direction). Thus, as shown, air supply stream 3a is preferably directed through supply stream chamber 11 in the same general direction as air coolant supply stream 10a is directed through stack 1.

In FIG. 1, humidifier 2 is depicted as external to stack 1 and is preferably modular and easily separable from stack 1 for purposes of maintenance and servicing.

Satisfactory humidification of air supply stream 3a is obtained with appropriate design of humidifier 2 and appropriate system operating parameters. As disclosed in the aforementioned '156 patent application, considerations in humidifier design include the rate of water vapor exchange through water permeable membrane 13 and hence the membrane material type and thickness. Operating parameters including the volume flow rates and compositions of the gas streams are also considerations in selecting an appropriate humidifier design. It can be preferable to select a humidifier design and system operating parameters such that the aforementioned parameter R (the ratio of residence time divided by diffusion time for a hypothetical water molecule in a given chamber in the humidifier) for the flows in either chamber 11, 12 are between about 0.75 and 3.

In FIG. 1, membrane 13 is a microporous polymer membrane comprising a hydrophilic additive or filler. The pore structure of the microporous membrane and the nature and amount of the additive are such that the rate of water exchange is satisfactory for humidification yet such that the exchange rate between air and oxygen-depleted air is not excessive; in other words, the membrane is substantially permeable to water and does not transfer air or oxygen-depleted air to an extent that significantly interferes with the operation of the fuel cell. For instance, a highly porous membrane with too large an average pore diameter may permit a satisfactory transfer of water but may not prevent a substantial transfer of oxygen-depleted air 3c into air supply stream 3a and thus an unacceptable dilution of heated and humidified air supply stream 3b. It may also permit a substantial transfer of air supply stream 3a into air exhaust stream 3c, which can amount to an unacceptable waste in energy providing pressurized. air supply stream 3a. Certain membranes may be satisfactory for use even though not fully wettable to water. However, it has been found that with sufficient hydrophilic additive, a microporous membrane can adsorb water or "wet" to such an extent that the water adsorbed in the membrane advantageously effects a "seal" thus substantially reducing the rate of air or oxygen-depleted air transfer across it. Thus, membrane characteristics that result in unacceptable air or oxygen-depleted air exchange when the membrane is "dry" may still prove acceptable when the membrane is "wet". In some embodiments, the water permeable membrane may become substantially impermeable to air and oxygen-depleted air when the membrane is wet or substantially wet.

Improved membranes with properties in a suitable range for the solid polymer fuel cell system of FIG. 1 include high density microporous polyethylenes or other polymers filled with submicron hydrophilic silica powder additives (for example, Duramic products or the PPG TESLIN® series). Membranes containing other components may also be suitable (for example, a membrane comprising glass fiber sheet impregnated with silica and polymeric material). Preferred examples of these kinds of membranes have porosities greater than about 50%, average pore diameters in the range from about 0.025 to 0.1 micrometers, and are characterized by Gurley air flow values in the range from-about 50 to 4000 seconds per 100 cm$^3$ air. In a membrane exchange humidifier, these properties permit a satisfactory exchange of water for humidification purposes.

Some transfer of air and oxygen-depleted air can take place across such membranes though, especially when dry. In solid polymer fuel cell applications, a small amount of gas transfer may be acceptable. For instance, it may be acceptable for up to about 10% of the gas volume to transfer through the membrane for brief periods (for example, during startup) and about 1% of a reactant gas volume to transfer through the membrane during steady state operation. In some embodiments, the water permeable membrane is selected from membranes that, when used in operation, transfer up to about 1% of a reactant gas volume or a fluid volume through said membrane. However, these membranes typically comprise more than 25% by weight of silica additive and thus may adsorb a substantial weight of water (for instance, 60% loaded TESLIN® can adsorb up to about 10% by weight water at 100% RH according to the manufacturer's specifications). This amount of additive is sufficient for the membrane to effectively "seal" against transfer of air and oxygen-depleted air when the membrane is "wet". In fact, this "seal" can be essentially complete thereby preventing significant transfer of gas. Following storage of the fuel cell system in FIG. 1, membrane 13 may be "dry" and the rate of air transfer therethrough would be relatively high during system startup. However, such membranes typically show good transient characteristics in that water adsorption is fairly rapid (for example, water uptake can be almost complete within about 10 minutes of exposure to water). Thus, only a short period of time may be needed before the membrane effectively "seals" during startup. (Desirable pore structure characteristics for a membrane for use in a given fuel cell humidifier application can be estimated to some extent if one is willing to assume that the pores in a membrane are cylindrically shaped. The air flux through the membrane can then be calculated based on the number of pores per unit area, average pore size, and pressure differential across the membrane. This estimate can then be compared to the flux that can be tolerated through the membrane in a given application.)

Advantageously, such microporous silica filled polymer membranes are also inexpensive, tough, dimensionally stable under varying heat and humidity conditions, and may be melt-bonded or bonded using adhesives. The use of membranes with these mechanical properties allows for a simpler configuration and simplified assembly of a membrane exchange humidifier than that previously used. Some other membrane exchange humidifiers employ plate-and-frame assemblies in which compression seals were used to effect seals between membrane and frames. Consequently, bridges were-required across the fluid ports formed in the frames in order to provide surfaces upon which to make compressions seals around the fluid ports. However, with a bondable, dimensionally stable membrane and the generally modest pressure difference across membrane 13 in operation (for example, about 1-2 psi (6.9-13.8 kPa)), bonded seals may be successfully employed instead. Also, there is generally no requirement for bridges across the fluid ports.

Figure 2:
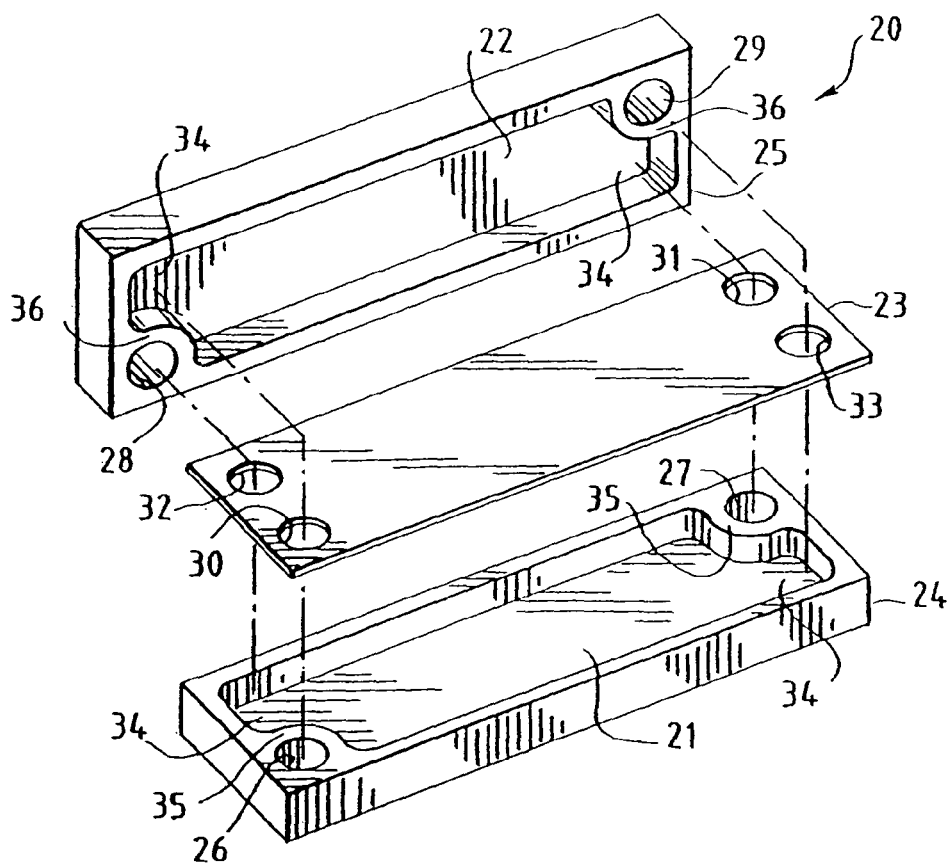
FIG. 2 is an exploded perspective view of a simplified plate-and-frame membrane exchange unit, which can optionally be used to construct a multiple plate-and-frame membrane exchange humidifier.

FIG. 2 depicts an exploded perspective view of an improved single membrane and frame unit 20 which can optionally be used to construct a stack of multiple membrane and frame units in order to increase its capacity by increasing the membrane surface area exposed to the fluid streams. Rectangular unit 20 comprises membrane 23 interposed between lower frame 24 and upper frame 25. Lower frame 24 comprises two lower ports 26, 27 at opposite ends of its periphery. Upper frame 25 comprises two upper ports 28, 29 at opposite ends of its periphery. Membrane 23 comprises four openings 30, 31, 32, 33. When assembled, the two openings 30 and 31 align with ports 26 and 27 respectively in lower frame 24 and thus provide fluid communication between ports 26, 27 and the interior chamber 22 of upper frame 25. In a like manner, the two openings 32 and 33 align with ports 28 and 29 respectively in upper frame 25 and thus provide fluid communication between ports 28, 29 and the interior chamber 21 of lower frame 24. When multiple units 20 are stacked one on top of the other, ports 26, 27, 28, 29 form internal fluid manifolds for supplying and exhausting fluid streams to and from frames 24 and 25.

Each of the necessary seals between membrane 23 and frames 24 and 25 is preferably made by bonding, either melt-bonding or by way of adhesives. These seals are made during assembly of each individual unit 20 when pressure for bonding purposes can be applied to both sides of the sealing surfaces. With bonded seals, supporting bridges are not required in areas 34 on frames 24, 25 opposite openings thereby simplifying design and assembly of unit 20. However, membrane 23 is still supported on both sides at its periphery by frames 24 and 25. Without complicating the design or assembly, membrane 23 is also supported on both sides by having portions 35 of lower ports 26 and 27 align with portions 36 of upper ports 28 and 29 respectively. When desired (for example, in larger membrane and frame units), additional supporting ribs may be provided within the frame interiors 21 and 22. However, unless formed in the membrane itself, such ribs preferably connect to a frame periphery (not shown) in order that the frame can be fabricated as a single piece.

As shown in FIG. 2, lower frame 24 is actually of the same construction as upper frame 25 but one frame is rotated with respect to the other in order to obtain the desired alignment of the ports. Thus, a single type of part can be used for both frames. (If the frames are the same and connected supporting ribs are employed, the ribs and connectors joining the ribs to the frame periphery are offset such that they do not stack directly over those in an adjacent frame thereby impeding flow through the chamber.) As shown, the frame design is such that pieces can be manufactured from an appropriate sheet using simple die-cut methods. Alternatively the frames can be manufactured by injection molding. The frames in turn can be laminated to the membrane in a continuous web process or alternatively injection molded directly onto the membrane in order to make membrane and frame units.

Two solid plates (not shown) at each end of the membrane exchange humidifier are used to complete the humidifier assembly. In a humidifier comprising a stack of units 20, each adjacent pair of units forms a humidifier chamber defined by a lower frame of one unit mated with the upper frame of an adjacent unit. (Units in the stack may be bonded to one another by various thermoplastic bonding processes including ultrasonic, friction, RF or hot plate welding. It may be advantageous to employ tongue-in-groove geometry in the frames (not shown in FIG. 2) for locating and bonding adjacent units.) The stack therefore consists of alternating supply and exhaust stream chambers. Each unit in the stack is rotated with respect to its adjacent units such that ports 26, 27, 28, 29 in each unit properly align with those in the adjacent units so as to form internal fluid manifolds. Except at the stack ends, each chamber is thus bounded by two adjacent membranes and two adjacent frames. The interior height of these chambers (equivalent to channel depth) is essentially twice the thickness of a frame. However, these chambers are bounded by membranes on two sides and thus a preferred interior height may be essentially twice that of a channel bounded by a membrane on only one side. As set forth in the aforementioned '156 application, it can be advantageous for the frame thickness to be in the range from 0.5 mm to 3 mm. Where there are no impermeable separating surfaces (that is, no plate webs) in or between units in the stack, the overall thickness of the humidifier assembly can be reduced.

For certain membrane materials, it may be possible to form suitable frames using the membrane itself (with pores in the formed frames being closed appropriately in the forming process). For instance, continuous ribs formed around the periphery of membrane 23 in FIG. 2 may serve as frames 24, 25 in a membrane-and-frame unit 20. Supporting ribs may also be formed in such membrane materials which, if some porosity is maintained, can increase the membrane surface area available for the exchange of heat and humidity.

The use of such membranes is expected to be beneficial with regards to design and construction considerations in humidifiers based on alternative constructions such as tubular bundle or spiral wound constructions. For instance, certain of these membrane materials may be extruded using conventional extrusion techniques. A hollow extrusion die with a grid shaped orifice may therefore be employed to extrude a tubular bundle humidifier embodiment consisting of a bundle of adjacent rectangular tubes in which supply and exhaust tubes are alternated within the bundle. As another example, ribs may be suitably formed in a sheet of membrane material such that, when the sheet is spirally wound, the ribs separate adjacent wraps of membrane and serve as the walls of supply and exhaust chambers in a spirally wound humidifier. In this embodiment, formed ribs may also be employed to define features for directing fluid flow.

While the aforementioned membrane types and humidifier configurations are preferred options for a solid polymer fuel cell system, other membrane types and/or humidifier configurations may be contemplated instead. For instance, depending on system specifics, different membrane porosities, pore sizes, material types, additives and the like may be preferred.

Fiber shaped hydrophilic additives may, for example, be preferred for purposes of strength. Additionally, the preceding improved humidifier construction may be adopted when using a membrane type having the necessary mechanical properties.

The following examples have been included to illustrate different embodiments and aspects of the invention but the invention should not be construed as limited to those examples.

EXAMPLES

The performance of a variety of membrane materials was evaluated in a membrane exchange humidifier operating under conditions expected in a typical solid polymer fuel cell system. The humidifier employed a single membrane, countercurrent flow, plate-and-frame type of construction such as shown in FIG. 1. The interior length, width, and depth of the chambers in the humidifier were about 22 cm, 3.8 cm, and 0.1 cm respectively. The active area of the membrane materials tested was about 50 $cm^2$.

The simulated dry fuel cell oxidant supply stream supplied to the humidifier was ambient air (approximately 20° C. and with a 10° C. dewpoint) at a flow rate of 6 L/minute and 1 psig (about 6.9 kPa gauge). The simulated wet fuel cell oxidant exhaust stream supplied to the humidifier was heated and humidified air from a contact humidifier (at 65° C. and with a 69° C. dewpoint, implying water was present in both the liquid and gas phase) at a flow rate of 5.4 L/minute and about ambient pressure. (These flow rates are in a range expected for a solid polymer fuel cell system operating at about a 100 Watt level.) After allowing about 30 minutes for the test membranes to equilibrate, the dewpoint of the air supply stream was measured as it exited the humidifier. A higher dewpoint indicates greater humidification.

The ability of the membrane materials to withstand the repeated hydration and dehydration cycles expected during actual humidifier operation was also tested by subjecting samples to 500 wet/dry cycles and checking mechanical integrity thereafter. Each cycle consisted of exposing a sample initially to water at 60° C. for 0.5 hour and then to hot dry air at 60° C. for 1 hour.

Table 1 below summarizes the dewpoint and physical condition of the membrane samples after the performance and mechanical integrity testing for the various materials tested.

TABLE 1

Summary of dewpoint and physical condition after cycling of tested membrane samples

| Material | Description | Dewpoint temperature (° C.) | Condition after 500 hydration/dehydration cycles |
|---|---|---|---|
| Du Pont NAFION ® 117 | perfluorosulfonic acid sheet | 53 | distorted, cracked, blistered |
| OSMONICS ® MX50 | PVA coating on polyester support | 52 | active layer cracked and peeled |
| OSMONICS ® QX | cellulose acetate on cellulose paper | 51 | some delamination |
| SULZER CHEMTECH ® Pervap 2256 | polyvinyl acetate on non-woven support | 51 | active layer cracked and peeled at points of stress concentration |
| Membrane Technology and Research MRT1 | undisclosed | 37 | results not available |
| PALL ® SG 450 WEI PP-PE | polysulfone on non-woven backing | 52 | intact |
| PALL ® Supor | microporous polyether sulfone | 47 | intact |
| PALL ® Biodyne | microporous nylon | 48 | embrittled, turned to powder |
| PPG Ind. TESLIN ® 010 | microporous silica filled polyethylene | 52 | minor discoloration, otherwise unchanged |
| Duramic | microporous silica filled PE | 53 | results not available |
| Amerace FLEX-SIL ® | microporous silica filled latex | 51 | results not available |

Several membrane materials provide humidification similar or better to that provided by NAFION®. However, many did not survive the cycling test. While two of the PALL® samples survived the cycling test, the dry air permeability of the PALL® samples was unacceptably high. Only the microporous silica filled samples from PPG had acceptable dry air permeability and survived the cycling test. The microporous silica filled samples from Duramic and Amerace also had acceptable dry air permeability and are expected to survive the cycling test.

Additional testing was performed in two different membrane exchange humidifiers comprising a stack of membrane exchange units at variable air supply stream flow rates with NAFION® and TESLIN® samples respectively. Here, the dewpoint and actual temperature of the air supply stream was measured as it exited the humidifier. These values as a function of air supply stream flow rate per membrane are plotted in FIG. 3. Plot points A show the temperature of the air supply stream as it exited the humidifier comprising the TESLIN® membrane. Plot points B show the dewpoint of the air supply stream as it exited the humidifier comprising the TESLIN® membrane. Plot points C show the temperature of the air supply stream as it exited the humidifier comprising the NAFION® membrane. Plot points D show the dewpoint of the air supply stream as it exited the humidifier comprising the NAFION® membrane. The results with the TESLIN® membranes were as good as or superior to those with the NAFION® membranes.

The flow rate of air through different types of membrane material was determined for samples in both a dehydrated and a hydrated state. (Samples were hydrated by spraying water on the sample surface.) The flow rate results using a 2 psi (13.8 kPa) air pressure differential per square meter ($m^2$) of sample are shown in Table 2.

TABLE 2

Air flow rates through dehydrated and hydrated membrane samples

| Material | Flow rate when material is dry (sLpm/m²) | Flow rate when material is wet (sLpm/m²) |
| --- | --- | --- |
| TESLIN ® | 4.6 | 0 |
| NAFION ® 117 | 0 | 0 |
| OSMONICS ® CV | 0.1 | 0 |
| Dupont Tyvek ® | 300 | 250 |

In Table 2, "sLpm" means standard liters per minute. As shown in Table 2, the TESLIN® sample is characterized by a significant air flow rate when dry, but is essentially sealed when wet. TYVEK® on the other hand is also characterized by a significant airflow rate when dry, but does not wet and hence does not seal when hydrated. The other samples showed little or no air flow in either state of hydration.

Several membrane exchange humidifier units having about 90 cm² of TESLIN® membrane area were constructed as generally shown in FIG. 2 (except that a few supporting ribs were employed). The humidifiers were operated successfully for over 24 hours to humidify a 5.8 sLpm dry air stream to between a 51° C. dewpoint and a 56° C. dewpoint using a 5.2 sLpm wet air stream at a temperature 65° C. with a 69° C. dewpoint. The integrity of the seals bonding the membrane and frame unit together was successfully maintained.

The above examples demonstrate that microporous polymers comprising a hydrophilic additive and having significant permeability to gases can be acceptable as membranes in solid polymer fuel cell humidification systems. Such membranes have improved mechanical characteristics and allow for simpler humidifier constructions.

While particular elements, embodiments and applications of the present invention have been shown and described, it will be understood, of course, that the invention is not limited thereto since modifications may be made by those skilled in the art without departing from the scope of the present disclosure, particularly in light of the foregoing teachings.

What is claimed is:

1. A method for humidifying a first fluid stream using a membrane exchange apparatus and a second fluid stream, wherein said first fluid stream comprises a first gas composition, and said second fluid stream comprises water vapor and a second gas composition that is different from said first gas composition, said method comprising:
    (a) employing a water permeable membrane comprising a microporous polymer and a hydrophilic additive, said membrane being substantially permeable when dry to at least one component of at least one of said first and said second gas compositions;
    (b) directing said first fluid stream across a major surface of said membrane,
    (c) directing said second fluid stream across an opposing major surface of said membrane,
    whereby said first fluid stream is humidified as it passes across said membrane surface.

2. The method of claim 1 wherein said membrane when wet is substantially impermeable to said at least one component.

3. The method of claim 1 wherein said membrane transfers up to about 1% of a fluid volume through said membrane.

4. The method of claim 1 wherein said membrane comprises a quantity of hydrophilic additive sufficient to render said membrane wettable to water.

5. The method of claim 1 wherein said second fluid stream further comprises liquid water.

6. The method of claim 5 wherein the dewpoint of said second fluid stream is greater than the temperature of said second fluid stream.

7. The method of claim 2 wherein said first gas composition is air and said second gas composition is oxygen-depleted air.

8. The method of claim 1 wherein said hydrophilic additive comprises at least one of silica and alumina.

9. The method of claim 1 wherein said hydrophilic additive comprises at least one of a fiber and a powder.

10. The method of claim 8 wherein said membrane comprises hydrophilic additive in an amount greater than about 25% by weight.

11. The method of claim 1 wherein said microporous polymer is high density polyethylene.

12. The method of claim 1 wherein said membrane porosity is greater than about 50%.

13. The method of claim 1 wherein said membrane average pore size is about 0.025 to 0.1 micrometers.

14. The method of claim 1 wherein said membrane Gurley air flow is about 500 to 4000 seconds per 100 cm³ air.

* * * * *